United States Patent
Santoro

(10) Patent No.: US 9,823,406 B2
(45) Date of Patent: Nov. 21, 2017

(54) LIGHT EXTRACTION ELEMENTS

(71) Applicant: Fluxwerx Illumination Inc., Delta (CA)

(72) Inventor: Scott Santoro, Delta (CA)

(73) Assignee: Fluxwerx Illumination Inc., Surrey (CA)

( * ) Notice: Subject to any disclaimer, the term of this patent is extended or adjusted under 35 U.S.C. 154(b) by 153 days.

(21) Appl. No.: 14/439,023

(22) PCT Filed: Oct. 31, 2013

(86) PCT No.: PCT/CA2013/050830
§ 371 (c)(1),
(2) Date: Apr. 28, 2015

(87) PCT Pub. No.: WO2014/067009
PCT Pub. Date: May 8, 2014

(65) Prior Publication Data
US 2015/0338566 A1   Nov. 26, 2015

Related U.S. Application Data

(60) Provisional application No. 61/720,961, filed on Oct. 31, 2012.

(51) Int. Cl.
*F21V 8/00* (2006.01)
*F21V 7/00* (2006.01)

(52) U.S. Cl.
CPC ......... *G02B 6/0045* (2013.01); *G02B 6/0038* (2013.01); *G02B 6/0063* (2013.01); *F21V 7/0091* (2013.01)

(58) Field of Classification Search
CPC ... G02B 6/0045; G02B 6/0038; G02B 6/0063
See application file for complete search history.

(56) References Cited

U.S. PATENT DOCUMENTS 5,128,787 A    7/1992  Blonder
5,608,837 A *  3/1997  Tai ................. G02B 6/0053
                                                  349/62

(Continued)

FOREIGN PATENT DOCUMENTS

CN    1952701 A    4/2007
CN    101151582 A  3/2008

(Continued)

OTHER PUBLICATIONS

Foley, Michael F., "Microstructured optical components fr waveguide-based luminaires", Corporate Technical White Paper, 2001, 9 pages. <http://www.orafol.com/tl_files/Energy/USA/papers?Microstructured-Optical-Comoments-for-Waveguide-based-Luminaires_Foley.2001.pdf>, retrieved Jan. 23, 2014.

*Primary Examiner* — Mary Ellen Bowman
(74) *Attorney, Agent, or Firm* — Oyen Wiggs Green & Mutala LLP

(57) ABSTRACT

A light guide includes: a first major surface; a second major surface opposite the first major surface; an array of extraction elements, each element disposed between an upper and lower edge of the first major surface, each upper and lower edge defining a plane therebetween, each element including: a first face adjoining the upper edge, the first face projecting inwardly relative to the plane at a first angle; a second face adjoining the first face, the second face projecting inwardly at a second angle relative to the plane, the second angle greater than the first angle; a third face adjoining the lower edge and the second face, the third face projecting inwardly relative to the plane at a third angle, the third angle greater than the first angle; wherein the first face, second face and third face define an indentation projecting inwardly from the plane defined by the first major surface.

16 Claims, 8 Drawing Sheets

(56) References Cited

U.S. PATENT DOCUMENTS

| | | | | |
|---|---|---|---|---|
| 5,613,751 | A | 3/1997 | Parker | |
| 5,618,096 | A | 4/1997 | Parker | |
| 5,876,107 | A | 3/1999 | Parker | |
| 5,921,652 | A | 7/1999 | Parker | |
| 6,002,829 | A * | 12/1999 | Winston | F21V 5/02 385/129 |
| 6,030,089 | A | 2/2000 | Parker | |
| 6,048,081 | A | 4/2000 | Richardson | |
| 6,079,838 | A | 6/2000 | Parker | |
| 6,142,652 | A | 11/2000 | Richardson | |
| 6,347,874 | B1 * | 2/2002 | Boyd | G02B 6/0038 349/63 |
| 6,379,016 | B1 | 4/2002 | Boyd | |
| 6,502,961 | B1 | 1/2003 | Richardson | |
| 6,565,233 | B1 | 5/2003 | Richardson | |
| 6,644,823 | B2 * | 11/2003 | Egawa | G02B 6/0028 362/559 |
| 6,663,254 | B2 * | 12/2003 | Ohsumi | G02B 6/0018 362/23.16 |
| 6,712,481 | B2 | 3/2004 | Parker | |
| 6,749,312 | B2 | 6/2004 | Parker | |
| 6,752,505 | B2 | 6/2004 | Parker | |
| 6,827,456 | B2 | 12/2004 | Parker | |
| 6,874,913 | B2 | 4/2005 | Munro | |
| 6,924,945 | B1 | 8/2005 | Richardson | |
| 6,974,232 | B1 | 12/2005 | Richardson | |
| 7,004,611 | B2 | 2/2006 | Parker | |
| 7,090,389 | B2 | 8/2006 | Parker | |
| 7,160,015 | B2 | 1/2007 | Parker | |
| 7,163,332 | B2 | 1/2007 | Shimizu | |
| 7,165,873 | B2 | 1/2007 | Parker | |
| 7,195,389 | B2 | 3/2007 | Parker | |
| 7,226,196 | B2 | 6/2007 | Parker | |
| 7,322,730 | B2 | 1/2008 | Parker | |
| 7,354,184 | B2 | 4/2008 | Parker | |
| 7,356,211 | B2 | 4/2008 | Sugiura | |
| 7,357,553 | B2 | 4/2008 | Parker | |
| 7,364,341 | B2 | 4/2008 | Parker | |
| 7,364,342 | B2 | 4/2008 | Parker | |
| 7,367,705 | B2 | 5/2008 | McCollum | |
| 7,374,305 | B2 | 5/2008 | Parker | |
| 7,384,177 | B2 | 6/2008 | Parker | |
| 7,404,660 | B2 | 7/2008 | Parker | |
| 7,404,661 | B2 | 7/2008 | Parker | |
| 7,434,973 | B2 | 10/2008 | Parker | |
| 7,434,974 | B2 | 10/2008 | Parker | |
| 7,467,887 | B2 | 12/2008 | Parker | |
| 7,497,599 | B2 | 3/2009 | Parker | |
| 7,513,672 | B2 | 4/2009 | Parker | |
| 7,524,101 | B2 | 4/2009 | Parker | |
| 7,537,370 | B2 | 5/2009 | Parker | |
| 7,563,012 | B2 | 7/2009 | Parker | |
| 7,667,238 | B2 | 2/2010 | Erchak | |
| 7,712,932 | B2 | 5/2010 | Parker | |
| 7,736,043 | B2 | 6/2010 | Parker | |
| 7,780,329 | B2 | 8/2010 | McCollum | |
| 7,798,695 | B2 | 9/2010 | Parker | |
| 7,810,982 | B2 | 10/2010 | Parker | |
| 7,875,218 | B2 | 1/2011 | Parker | |
| 7,876,489 | B2 | 1/2011 | Gandhi | |
| 7,959,341 | B2 | 6/2011 | Erchak | |
| 7,963,687 | B2 | 6/2011 | Parker | |
| 8,111,968 | B2 | 2/2012 | Chakmakjian | |
| 2001/0030857 | A1 | 10/2001 | Futhey | |
| 2003/0034445 | A1 * | 2/2003 | Boyd | G02B 6/0038 250/227.11 |
| 2004/0246698 | A1 | 12/2004 | Shimizu | |
| 2011/0194034 | A1 | 8/2011 | Shimizu | |
| 2015/0285983 | A1 * | 10/2015 | Santoro | G02B 6/0038 362/611 |
| 2016/0299281 | A1 * | 10/2016 | Robinson | G02B 6/0048 |

FOREIGN PATENT DOCUMENTS

| | | |
|---|---|---|
| CN | 101164006 A | 4/2008 |
| CN | 100432717 C | 11/2008 |
| CN | 101490604 A | 7/2009 |
| EP | 0751340 A2 | 1/1997 |
| EP | 0965789 A2 | 12/1999 |
| EP | 0965788 B1 | 2/2004 |
| EP | 1794639 A2 | 6/2007 |
| EP | 1451502 B1 | 5/2010 |
| EP | 1163473 B1 | 9/2010 |
| EP | 2244005 A1 | 10/2010 |
| EP | 2518544 A1 | 10/2012 |
| EP | 1415110 B1 | 10/2014 |
| JP | 4272751 A | 1/2000 |
| JP | 4448252 B2 | 11/2002 |
| JP | 2003-114337 A | 4/2003 |
| JP | 4349902 B2 | 3/2005 |
| JP | 2008515026 A | 5/2008 |
| JP | 2008519311 A | 6/2008 |
| JP | 4272752 B2 | 6/2009 |
| JP | 2009152207 A | 7/2009 |
| JP | 4378172 B2 | 12/2009 |
| JP | 2010056094 A | 3/2010 |
| JP | 2010056095 A | 3/2010 |
| KR | 1020040017341 A | 2/2004 |
| KR | 20050044695 A | 5/2005 |
| KR | 100729886 B1 | 6/2007 |
| KR | 1020070085643 A | 8/2007 |
| KR | 100961043 B1 | 6/2010 |
| KR | 1020100084704 A | 7/2010 |
| KR | 100979826 B1 | 9/2010 |
| KR | 100989695 B1 | 10/2010 |
| KR | 1020070061901 A | 12/2011 |
| TW | I225543 B | 12/2004 |
| TW | I243920 B | 11/2005 |
| TW | I246576 B | 1/2006 |
| TW | I266845 B | 11/2006 |
| TW | 200846731 A | 12/2008 |
| TW | I333535 B | 11/2010 |
| TW | I362467 B | 4/2012 |
| WO | 2014067006 A2 | 5/2014 |

* cited by examiner

LIGHT EXTRACTION ELEMENTS

RELATED APPLICATION

This application claims priority to, and incorporates by reference in its entirety, U.S. provisional application No. 61/720,961 filed 31 Oct. 2012.

TECHNICAL FIELD

This invention relates to light extraction elements, and in particular light extraction elements of light guides for light emitting panel assemblies such as luminaires.

BACKGROUND

Light emitting panel assemblies use light guides to transmit light from point light sources such as light emitting diodes (LEDs) to extraction elements where the light is extracted. Luminaires are an example of light emitting panel assemblies.

One objective in lighting is to provide even illuminance on a work plane, which can be achieved by providing a lighting distribution known in the art as a "batwing" distribution. Another objective in lighting is to eliminate or reduce glare. Glare is an effect of luminance at high vertical angles that can cause visual discomfort to users.

Luminance of a luminaire is determined by dividing luminous intensity by projected area at a particular angle.

Conventional luminaires are horizontally oriented, i.e., the luminaire is wider than it is tall. This configuration allows light to leave towards the work plane from traditional sources such as fluorescent and incandescent light sources. A challenge with this configuration is that projected area shrinks as the angle increases so increasing luminous intensity in order to provide even illuminance would create unacceptable levels of high vertical angle luminance, i.e., glare. Baffling is one measure that may be used to mitigate glare in horizontally-oriented luminaires.

Vertically oriented luminaires are advantageous because projected area is smaller at low vertical angles where less luminous intensity is required and projected area increases as the vertical angle increases, as illustrated for example in FIGS. 1 and 2A to 2D. This configuration allows luminous intensity to be higher at higher vertical angles compared to that of a horizontally oriented luminaire, avoiding the problem of glare which would otherwise require resorting to additional measures such as baffling. A challenge with this configuration is that the small projected area at low vertical angles results in high luminance at these angles, as illustrated for example in FIG. 2A. While luminaires are typically installed above users and not in their direct field of view, too much luminance at low vertical angles can still cause visual discomfort in their peripheral field of view. Minimizing luminous intensity at lower vertical angles is thus desirable for vertically oriented luminaires. Conventional light extraction elements, however, typically allow too much light to be emitted at these lower vertical angles.

Light extraction elements that optimize light distribution for vertically oriented luminaires are desirable. For certain designs of vertically oriented luminaires, it is additionally desirable for a light guide of the luminaire to be designed to emit most or all of the light from one side of the light guide.

SUMMARY

According to one claim of the invention, a light guide is provided. The light guide comprises: a first major surface; a second major surface opposite the first major surface; an array of extraction elements, each extraction element disposed between a corresponding upper edge and lower edge of the first major surface, each corresponding upper edge and lower edge defining a plane therebetween, each extraction element comprising: a first face adjoining the upper edge, the first face projecting inwardly relative to the plane at a first angle; a second face adjoining the first face, the second face projecting inwardly at a second angle relative to the plane, the second angle greater than the first angle; a third face adjoining the lower edge and the second face, the third face projecting inwardly relative to the plane at a third angle, the third angle greater than the first angle; wherein the first face, second face and third face define an indentation projecting inwardly from the plane defined by the first major surface.

A length of the first face may be greater than a length of the third face, and the length of the third face may be greater than a length of the second face. The second face and the third face may adjoin at a fourth face, wherein a length of the fourth face may be less than a length of the second face.

The first face, the second face and third face may be integrally configured to direct light from within the light guide incident upon the extraction element such that at least about 65% of the light is refracted out of the second major surface.

The first face, the second face and third face may be integrally configured to direct light from within the light guide incident upon the extraction element such that at least about 65% of the light incident upon the extraction element: (i) internally reflects off the first face to the second major surface, and refracts according to Fresnel equations out of the second major surface at a 20 to 60 degree angle from the vertical; and/or (ii) internally reflects off the first face and the second face, and refracts according to Fresnel equations out of the second major surface at a 100 to 140 degree angle from the vertical; and such that at least some of the remaining light incident upon the extraction element re-enters the light guide by: (i) refracting out of the first face and being incident upon the third face; (ii) reflecting off the first face, refracting out of the second face, and being incident upon the third or fourth face; and/or (iii) refracting out the second face, without first hitting the first face, and being incident upon the third or fourth face.

The light may be refracted out of the second major surface in an asymmetric batwing distribution.

The first angle may be between 10 and 20 degrees, or about 15 degrees. The second angle may be between 60 and 70 degrees, or about 65 degrees. The third angle may be between 65 and 75 degrees, or about 70 degrees. Each extraction element may span horizontally across the first major surface.

Extraction elements may be absent on the second major surface. The first major surface and the second major surface may be parallel.

The first major surface may taper toward the second major surface, and the second major surface may be vertical.

The light guide may comprise a substrate and a film, wherein the film comprises the first major surface and the extraction elements and is applied on the substrate. Alternatively, the array of extraction elements may be integral with the light guide.

According to another aspect, a method of making a light guide is provided. The method comprises extruding a thermoplastic polymeric material through a die corresponding to the cross sectional shape of a light guide as described herein.

According to another aspect, a method of making a light is provided. The method comprises applying to a first major surface of a substrate a film comprising an array of extraction elements as described herein.

According to another aspect, a luminaire is provided. The luminaire comprises: a housing; a light source; a light guide as described herein, wherein the light guide is in optical communication with the light source and vertically oriented in the housing. The luminaire may further comprise a reflective surface adjacent the first major surface, whereby light extracted out of the first major surface and incident upon the reflective surface is reflected back into the light guide and emitted out of the second major surface. The reflective surface may abut the first major surface.

Further aspects of the invention are provided as described in the following disclosure and accompanying drawings.

BRIEF DESCRIPTION OF THE DRAWINGS

In drawings which show non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The term "inwardly" and like terms as used in this specification refers to a direction toward the cross-sectional center of the light guide. The term "outwardly" and like terms as used in this specification refers to a direction away from the cross-sectional center of the light guide. The term "upward" and like terms as used in this specification refers to an upward direction when the light guide/luminaire is installed in a space. The term "downward" and like terms as used in this specification refers to a downward direction when the light guide/luminaire is installed in a space. The terms "vertical", "from the vertical", and like terms when referenced in association with angles in this specification refers to a downward pointing line, as shown for example in FIG. 6, wherein a 0 degree angle from the vertical is directly downward and a 180 degree angle from the vertical is directly upward.

Figure 1:
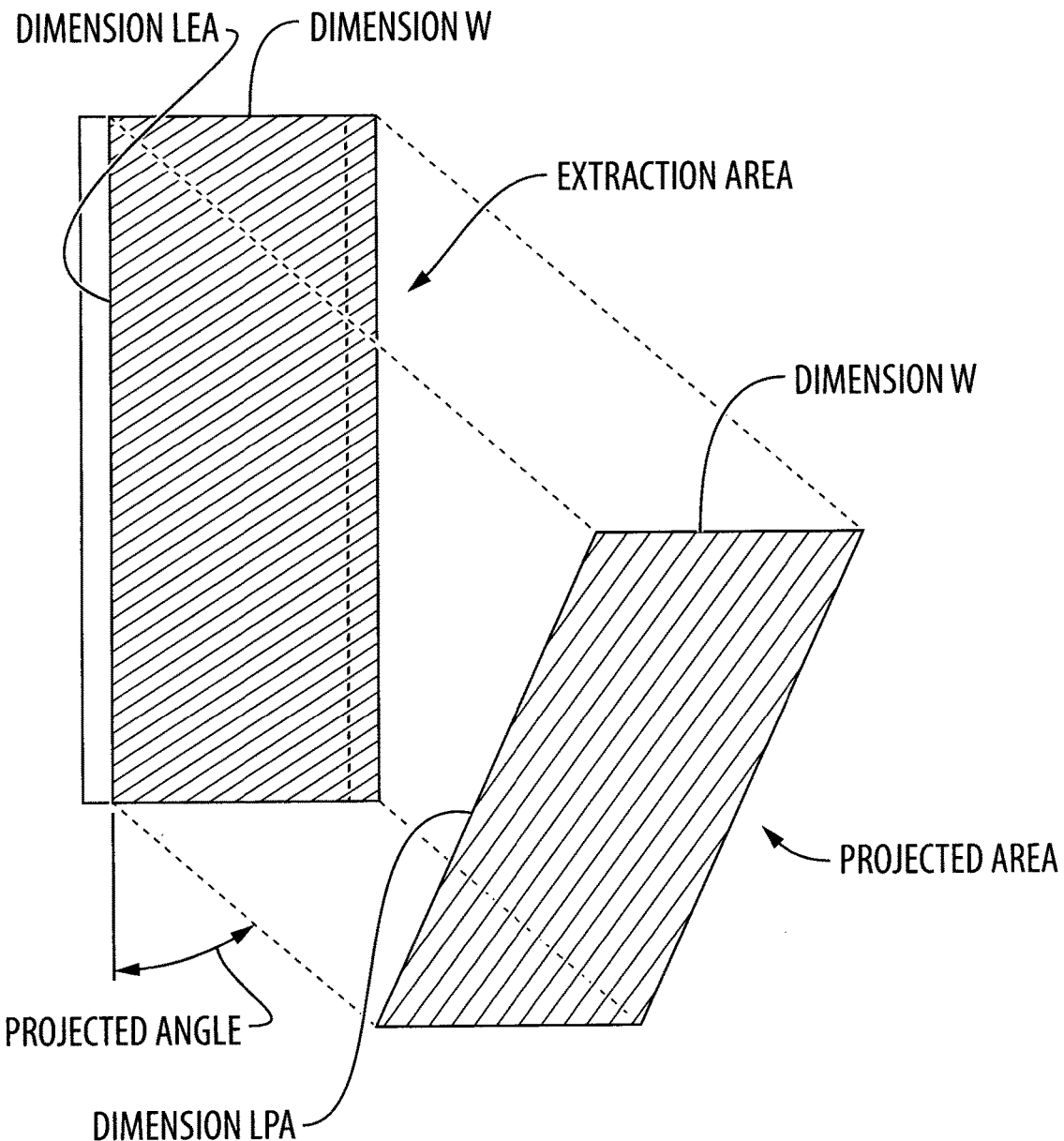
FIG. 1 is an isometric view of a vertically oriented light guide.
Figure 2:
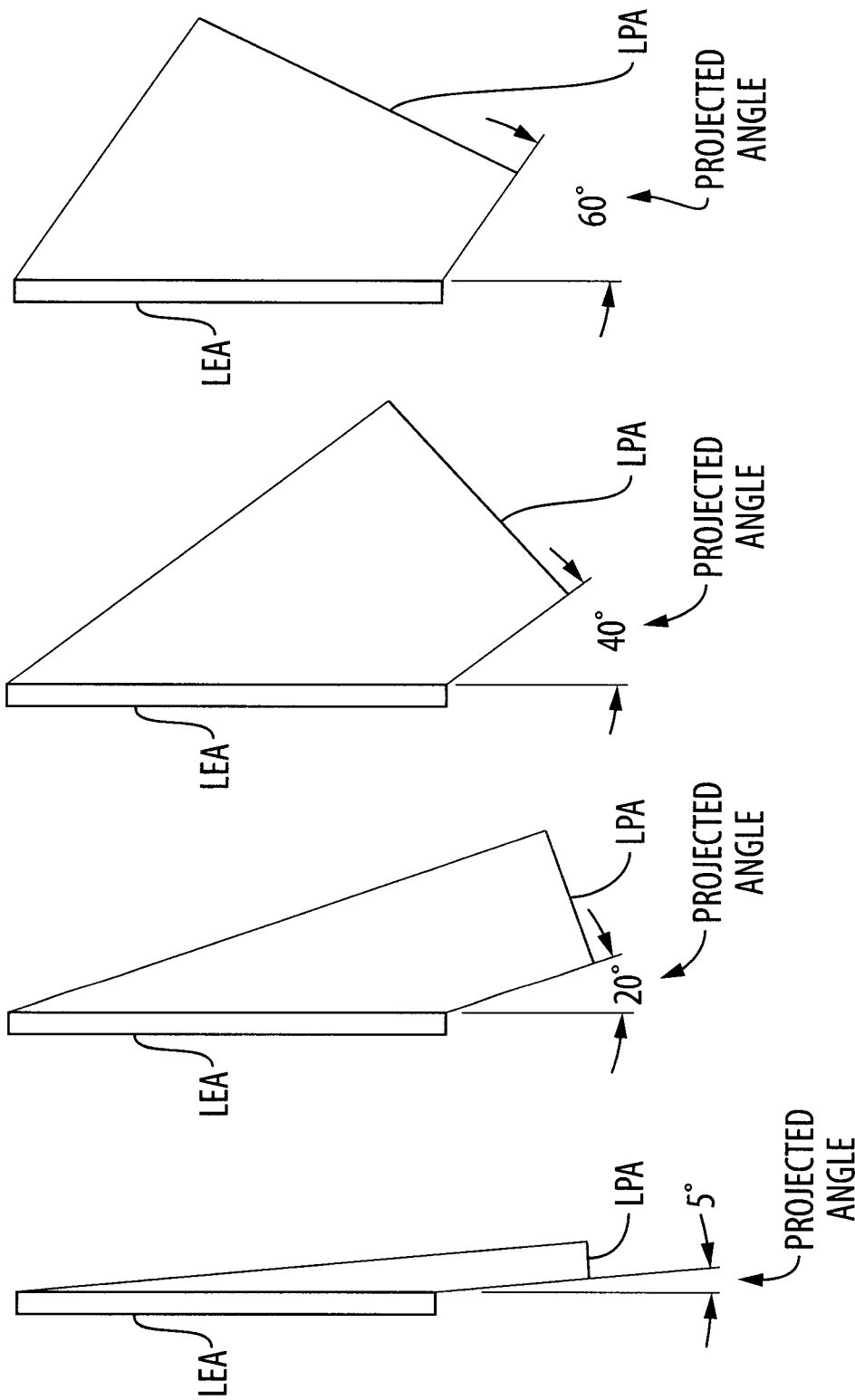
FIGS. 2A to 2D are end views of the light guide of FIG. 1 illustrating projected area at progressively higher angles.
Figure 3:
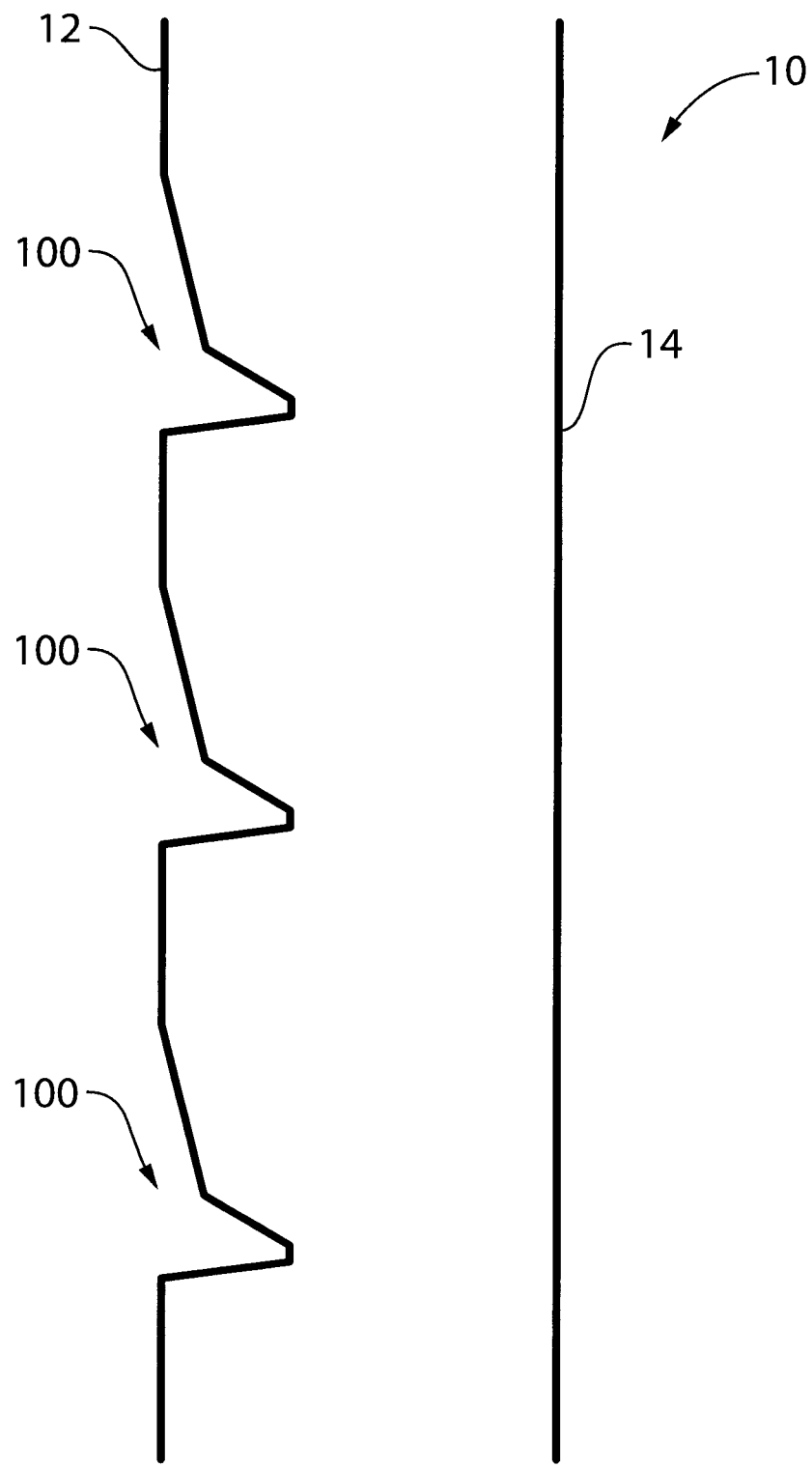
FIG. 3 is a close up partial cross-sectional view of a light guide showing a light extraction element according to an example embodiment.

FIG. 3 shows a cross section view of part of a vertically oriented light guide 10 according to an embodiment of the invention. The illustrated part is from an emission area of light guide 10, that is, where light from a light source (not shown) internally reflecting down light guide 10 is extracted. Light guide 10 includes a first major surface 12 and a second major surface 14. First major surface 12 and second major surface 14 are planar and parallel in the embodiment shown but in other embodiments may have other profiles.

First major surface 12 includes an array of extraction elements 100. Extraction elements 100 span horizontally across first major surface 12 in a continuous manner. In some embodiments, the array may comprise extraction elements uniformly distributed across the vertical span of the emission area of the light guide. In other embodiments, the array may comprise extraction elements progressively closer together down the vertical span of the emission area of the light guide. In some embodiments the extraction elements may be spaced apart while in other embodiments the extraction elements may be continuous down the vertical span of the light guide.

Figure 4:
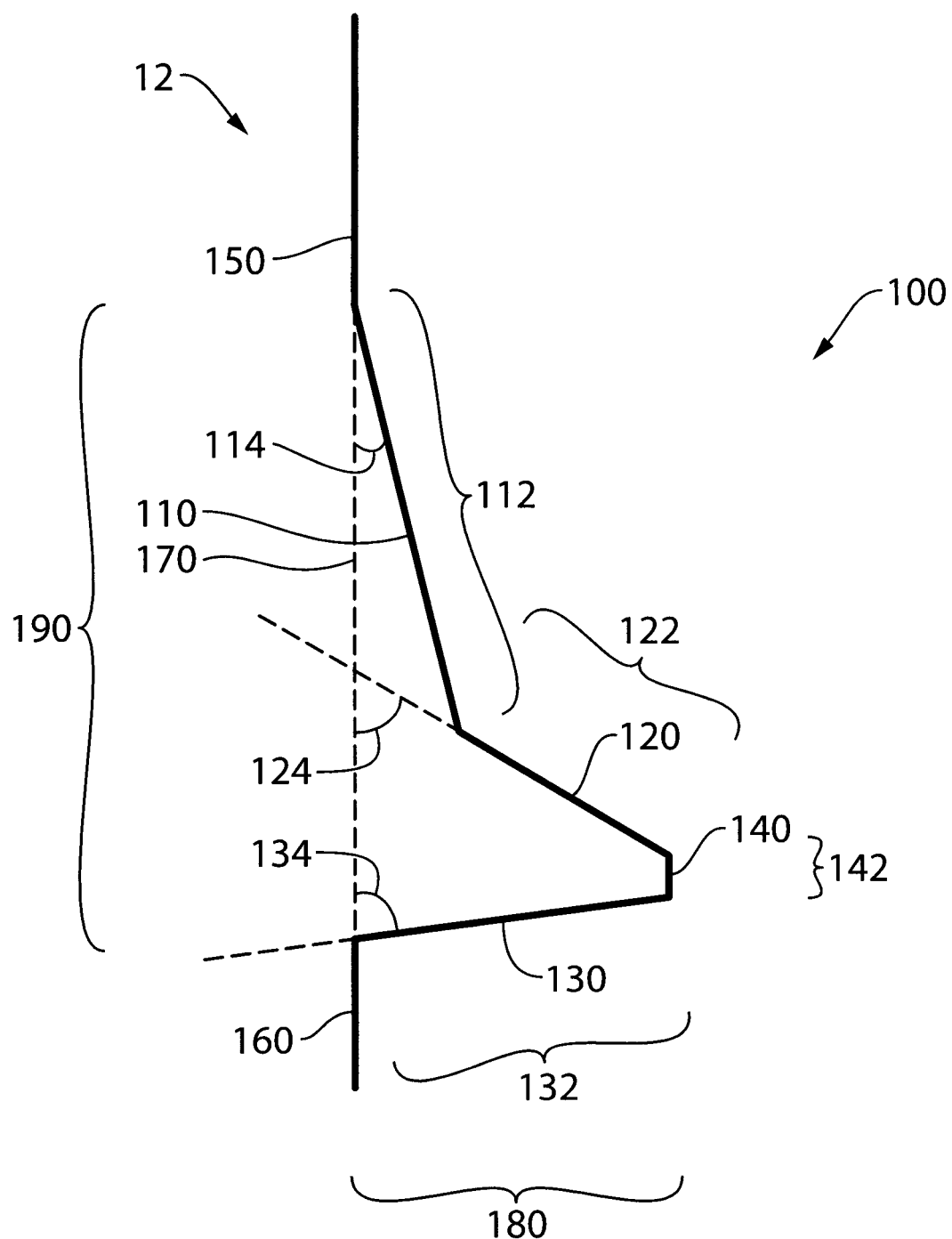
FIG. 4 is a close up partial cross-sectional view of the light guide of FIG. 3.

FIG. 4 shows a close up cross section view of extraction element 100. Extraction element 100 includes a first face 110, second face 120, a third face 130, and a fourth face 140. Each extraction element 100 is formed between an upper edge 150 and lower edge 160 of first major surface 12. First face 110 adjoins upper edge 150 and second face 120. Second face 120 adjoins first face 110 and fourth face 140. Fourth face 140 adjoins second face 120 and third face 130. Third face 130 adjoins fourth face 140 and lower edge 160. In some embodiments, fourth face 140 is absent and instead second face 120 directly adjoins third face 130.

Upper edge 150 and lower edge 160 of first major surface 12 define a plane 170 therebetween. Extraction element 100 in some embodiments may have a depth 180 relative to plane 170 in the range of 0.05 mm to 0.5 mm. Extraction element 100 in some embodiments may have a height 190, as defined from an uppermost edge of first face 110 to the lowermost edge of third face 130, in the range of 0.1 mm to 2 mm.

The orientation (i.e., angle) and size (i.e., length) of first face 110, second face 120 and third face 130 (and fourth face 140 if present) are integrally configured to ensure that as much light as possible from the light source is emitted from second major surface 14 in a primarily asymmetric distribution, generally by directing light incident on first face 110 and/or second face 120 to reflect toward second major surface 14, and by directing light refracting through first face 110 and/or second face 120 to be incident on third face 130 and refract toward second major surface 14.

In some embodiments, including the illustrated embodiment, first length 112 of first face 110 is longer than third length 132 of third face 130, third length 132 is longer than second length 122 of second face 120, and second length 122 is longer than fourth length 142 of fourth face 140.

In some embodiments, including the illustrated embodiment, first angle 114 defined between a plane of first face 110 and plane 170 may range from about 10 to 20 degrees, or be about 15 degrees; a second angle 124 defined between a plane of second face 120 and plane 170 may range from about 60 to 70 degrees, or be about 65 degrees; and a third angle 134 defined between a plane of third face 130 and plane 170 may range from about 65 to 75 degrees, or be about 70 degrees. In some embodiments, including the illustrated embodiment, second angle 124 and third angle 134 are greater than first angle 114.

Figure 5B:
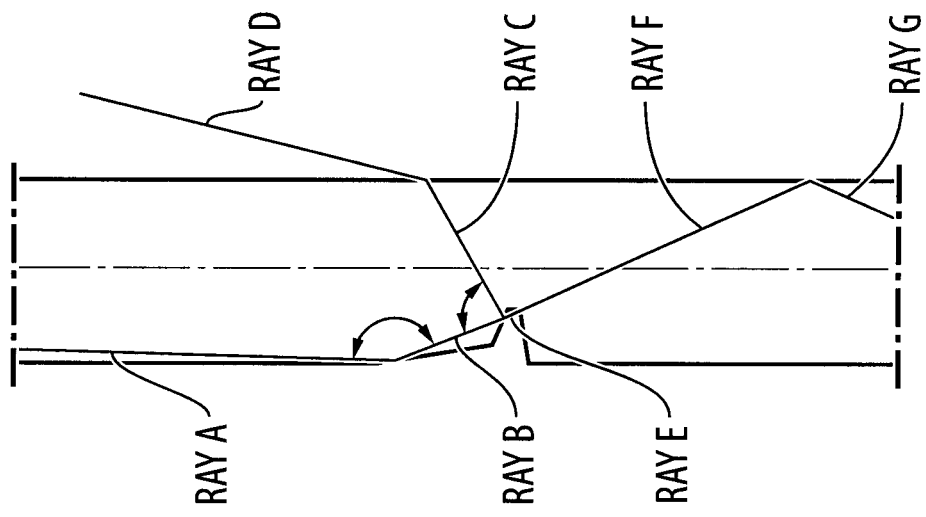
FIGS. 5A and 5B are close up partial cross-sectional views of the light guide of FIG. 3 showing paths of exemplary single light rays from a single light source.
Figure 5A:
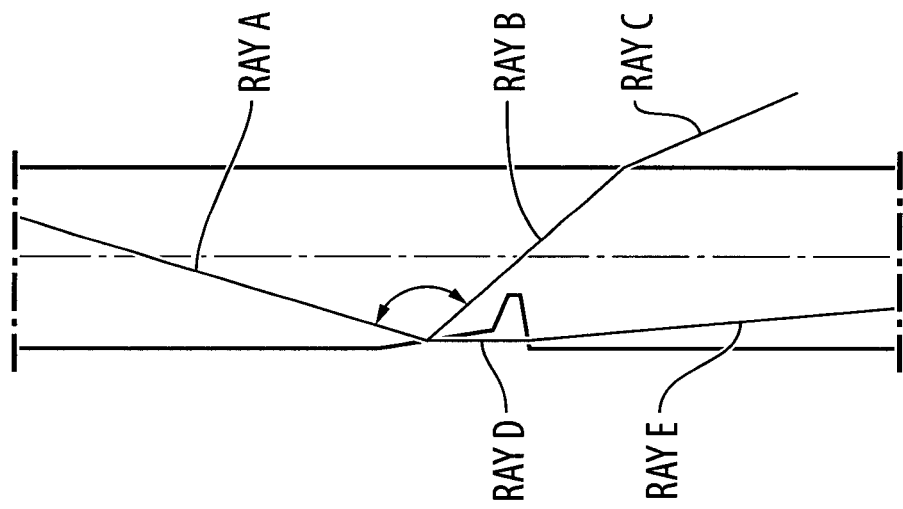

FIGS. 5A and 5B show the paths of representative rays of light internally reflecting down light guide 10, hitting extraction element 100, and exiting light guide 10 mostly out of second surface 14 in an asymmetric distribution. This light distribution concentrates luminous intensity at a desirable vertical angle range of about 20 to 60 degrees.

In FIG. 5A, Ray A hits first face 110 and splits into Ray B and Ray D. Ray B internally reflects off first face 110 and exits light guide 10 by refracting through second major surface 14 as Ray C. Ray D refracts out of light guide 10 through first face 110 and then reenters light guide 10 by refracting through third face 130 as Ray E.

In FIG. 5B, Ray A is a lower angle ray compared to Ray A of FIG. 5A. Ray A in FIG. 5B hits reflects off first face 110 and hits second face 120 to split into Ray C and Ray E. Ray C reflects off second face 120 and exits light guide 10 by refracting through second major surface 14 as Ray D. Ray E refracts out of light guide 10 through second face 120 and then reenters light guide 10 by refracting through third face 130 as Ray F. Ray F then internally reflects off second major surface 14 as Ray G.

First face 110, second face 120 and third face 130 are integrally configured to direct light from within light guide 10 incident upon the extraction element 100 such that at least about 65% of the light is refracted out of second major surface 14 at either a 20 to 60 degree angle from the vertical (at least about 35% of the light) or a 100 to 140 degree angle from the vertical (at least about 30% of the light).

Figure 6:
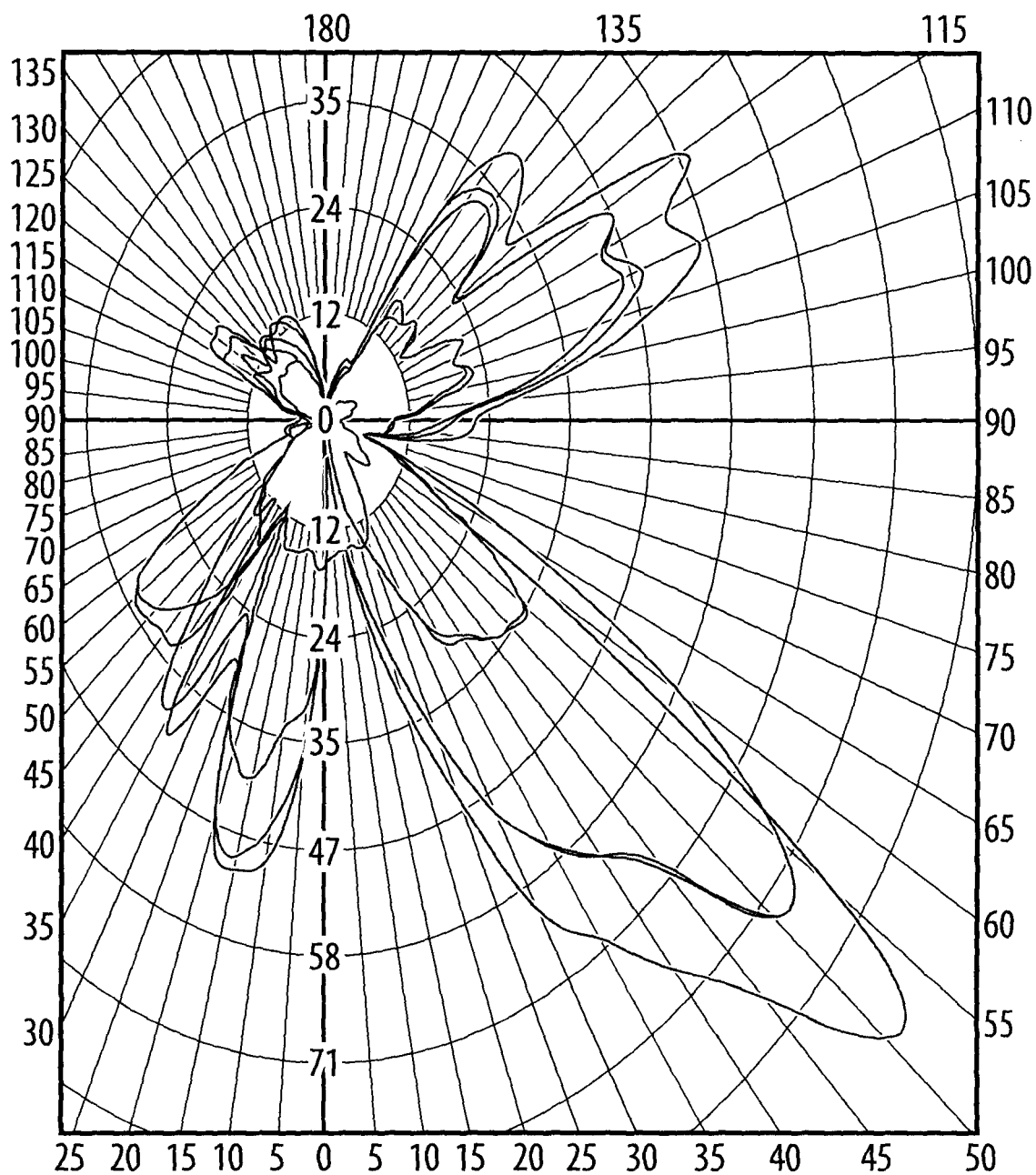
FIG. 6 is an optical distribution plot of light emitted from a light extraction element of a light guide according to an example embodiment.

FIG. 6 is a computer-generated optical distribution plot representative of the optical distribution of a light guide, such as light guide 10, according to an embodiment of the present invention. The light guide in FIG. 6 is oriented with first major surface (with the extraction elements of the present invention) facing toward the right of the Figure. The asymmetric batwing distribution shown in FIG. 6 is characterized in the lower left half (direct distribution) by a strong luminous intensity peak at approximately 40 degrees, and reduced luminous intensities between approximately 0 and 20 degrees and between approximately 60 to 90 degrees. The asymmetric batwing distribution is further characterized in the upper left half (indirect distribution) by a similar distribution of lesser luminosity to provide even illumination of surfaces above the light guide.

Figure 7:
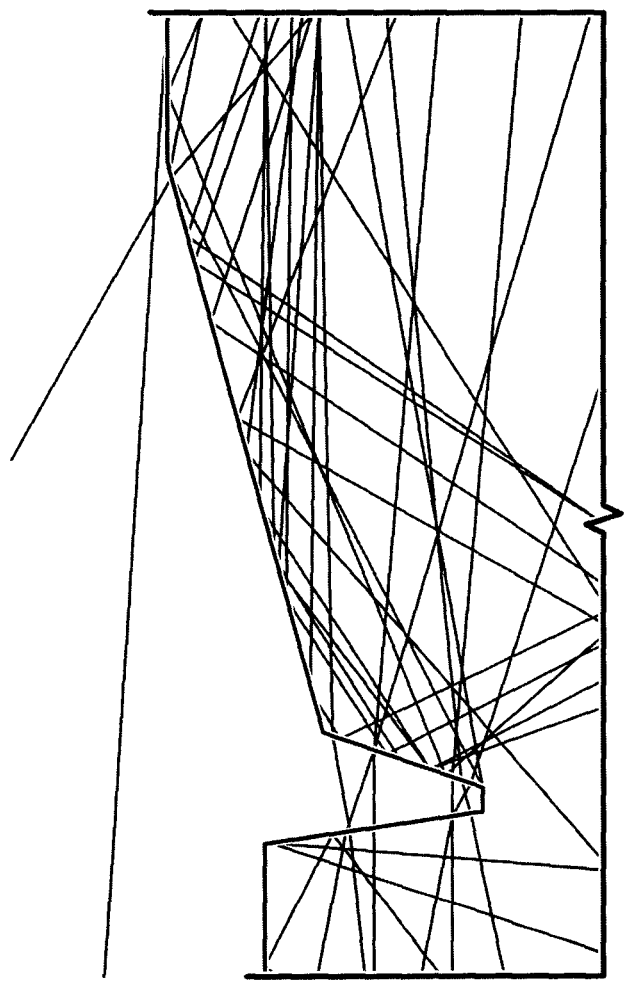
FIG. 7 is a close up partial cross-sectional view of a light extraction element of a light guide according to an example embodiment showing paths of exemplary multiple light rays from a single light source.
Figure 8:
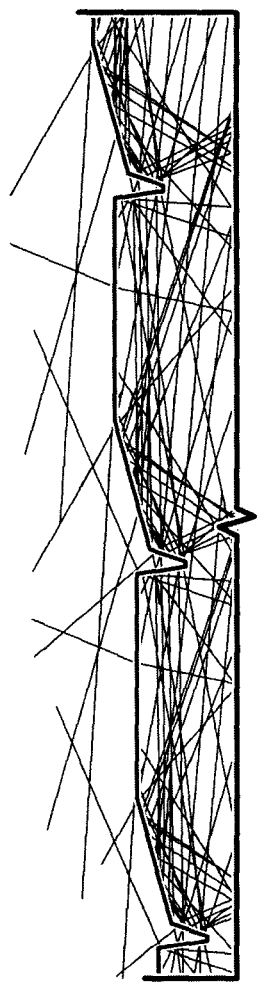
FIG. 8 is a close up partial cross-sectional view of a plurality of light extraction elements of a light guide according to an example embodiment showing paths of exemplary multiple light rays from a single light source.

FIGS. 7 and 8 show light extraction elements of a light guide according to an example embodiment showing the computer-generated paths of exemplary multiple light rays from a single light source. The distribution of light exiting the light guide corresponds to the asymmetric batwing distribution as shown for example in FIG. 6.

Figure 9:
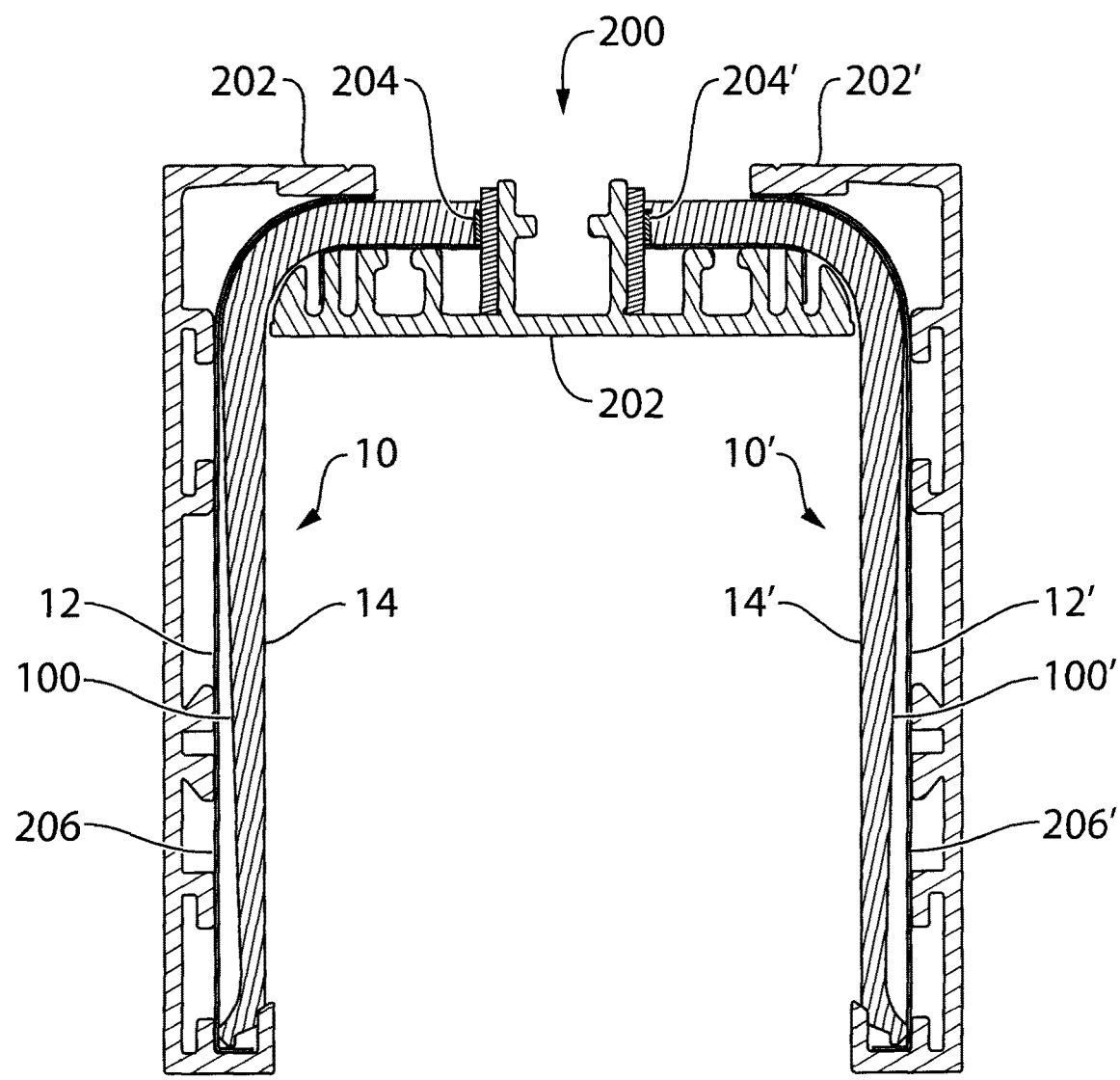
FIG. 9 is a cross-sectional view of a luminaire according to an example embodiment.

FIG. 9 shows a cross-sectional view of a luminaire 200 with opposing light guides 10, 10' disposed in a housing 202. Upstream ends of light guides 10, 10' abut, are integral with, or are adjacent to light sources 204, 204'. Each opposing light guide 10, 10' has respective first major surfaces 12, 12' and second major surfaces 14, 14'. A plurality of extraction elements 100, 100' as described herein are disposed on first major surfaces 12, 12'. Luminaire 200 also includes reflectors 206, 206'. In some embodiments, reflectors 206, 206' may be constructed of sheet-like materials with reflective surfaces oriented to face first major surfaces 12, 12' respectively. Reflectors 206, 206' reflect light exiting first major surfaces 12, 12' (as well as the downstream ends of light guides 14, 14') back into light guides 10, 10' to eventually be directed out of second major surfaces 14, 14'. In some embodiments, reflectors 206, 206' conform generally to the profile of first major surfaces 12, 12' as shown in FIG. 9.

In some embodiments, such as those illustrated herein, the extraction elements are integrally formed with the light guide. In such embodiments, the light guide may be formed by extruding a thermoplastic polymeric material through a die corresponding to the desired cross sectional shape of the light guide, or may be formed by injection molding. In other embodiments, the light guide may be formed by applying to each side of a planar panel a film comprising one or more extraction elements.

As will be apparent to those skilled in the art in the light of the foregoing disclosure, many alterations and modifications are possible in the practice of this invention without departing from the spirit or scope thereof. For example, in some embodiments:

First major surface 12, 12' and/or second major surface 14, 14', instead of being parallel, may taper toward the other surface in the downward direction.

First major surface 12, 12' and second major surface 14, 14', instead of being parallel, may have first major surface 12, 12' taper inward in the downward direction while second major surface 14, 14' remains substantially vertical.

The profile (i.e., cross sectional view) of first major surface 12, 12' and/or second major surface 14, 14' may be straight (as illustrated), curved, stepped, or any other shape.

One or more of the adjoining locations, i.e., where upper edge 150 meets first face 110, where first face 110 meets second face 120, where second face 120 meets fourth face 140, where fourth face 140 meets third face 130, and where third face 130 meets lower edge 160, may be formed as a rounded angle rather than a straight edge angle.

Light guide 10, 10' may (from a top plan view) be straight, curved, square, rectangular, polygonal, elliptical, circular (i.e., annular), or any other shape.

Light guide 10, 10' may comprise a combination of extraction elements as described herein and one or more other types of extraction elements.

One or more of faces 110, 120, 130 and 140 may be configured to provide diffuse refraction of light. Diffuse refraction may be provided at or adjacent the surface of the face. For example, diffuse refraction may be achieved by providing a diffuse surface on the face, overlaying a diffuse film on the face, providing a diffuse material within the light guide immediately underneath the face, and the like. In some embodiments, the diffusion may be in a linear pattern (e.g. ridges or grooves aligned horizontally across the face), while in other embodiments the diffusion may be non-linear or random (e.g. randomly arranged bumps or dimples).

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A light guide comprising:
    a first major surface;
    a second major surface opposite the first major surface;
    an array of extraction elements, each extraction element disposed between a corresponding upper flat surface of the first major surface comprising an upper edge and lower flat surface of the first major surface comprising a lower edge, each corresponding upper edge and lower edge defining a plane therebetween, each extraction element comprising:
        a first face adjoining the upper edge, the first face projecting inwardly relative to the plane at a first angle;
        a second face adjoining the first face, the second face projecting inwardly at a second angle relative to the plane, the second angle greater than the first angle;
        a third face adjoining the lower edge and the second face, the third face projecting inwardly relative to the plane at a third angle, the third angle greater than the first angle;
        wherein the first face, second face and third face define an indentation projecting inwardly from the plane defined by the first major surface.

2. A light guide according to claim 1, wherein a length of the first face is greater than a length of the third face, and the length of the third face is greater than a length of the second face.

3. A light guide according to claim 1, wherein the second face and the third face adjoin at a fourth face, wherein a length of the fourth face is less than each of a length of the first face, a length of the second face, and a length of the third face.

4. A light guide according to claim 1, wherein the first face, the second face and third face are integrally configured to direct light from within the light guide incident upon the extraction element such that at least about 65% of the light is refracted out of the second major surface.

5. A light guide according to claim 1, wherein the first angle is between 10 and 20 degrees, or about 15 degrees.

6. A light guide according to claim 1, wherein the second angle is between 60 and 70 degrees, or about 65 degrees.

7. A light guide according to claim 1, wherein the third angle is between 65 and 75 degrees, or about 70 degrees.

8. A light guide according to claim 1 wherein each extraction element spans horizontally across the first major surface.

9. A light guide according to claim 1, wherein extraction elements are absent on the second major surface.

10. A light guide according to claim 1, wherein the first major surface and the second major surface are parallel.

11. A light guide according to claim 1, wherein the first major surface tapers toward the second major surface, and wherein the second major surface is vertical.

12. A light guide according to claim 1 comprising a substrate and a film, wherein the film comprises the first major surface and the extraction elements and is applied on the substrate.

13. A light guide according to claim 1 wherein the array of extraction elements is integral with the light guide.

14. A luminaire comprising:
    a housing;
    a light source;
    a light guide according to claim 1, wherein the light guide is in optical communication with the light source and vertically oriented in the housing.

15. A luminaire according to claim 14, further comprising a reflective surface adjacent the first major surface, whereby light extracted out of the first major surface and incident upon the reflective surface is reflected back into the light guide and emitted out of the second major surface.

16. A luminaire according to claim 15, wherein the reflective surface abuts the first major surface.

* * * * *